United States Patent [19]
Janeke

[11] Patent Number: 5,191,761
[45] Date of Patent: Mar. 9, 1993

[54] AEROSPACE PLANE AND ENGINE

[76] Inventor: Charl E. Janeke, 261 Loveday Street, Muckleneuk; Pretoria, Transvaal Province, South Africa

[21] Appl. No.: 751,601

[22] Filed: Aug. 21, 1991

Related U.S. Application Data

[63] Continuation of Ser. No. 657,881, Feb. 19, 1991, abandoned, which is a continuation of Ser. No. 409,411, Sep. 18, 1989, abandoned.

[30] Foreign Application Priority Data

Sep. 16, 1988 [ZA] South Africa ................. 88/6955

[51] Int. Cl.$^5$ ............................................. F02K 7/18
[52] U.S. Cl. .................................... 60/224; 60/270.1
[58] Field of Search ............... 60/224, 244, 245, 252, 60/269, 270.1

[56] References Cited

U.S. PATENT DOCUMENTS

| | | | |
|---|---|---|---|
| 3,374,631 | 3/1968 | Marks | 60/244 |
| 3,541,957 | 6/1970 | Evans | 60/270.1 |
| 3,690,102 | 9/1972 | DuPont | 60/269 |
| 4,644,746 | 2/1987 | Hartman | 60/269 |
| 4,817,892 | 4/1989 | Janeke . | |

OTHER PUBLICATIONS

Science Year: The World Book Annual Science Supplement 1988—resume.
Wall St. Journal—Jun. 19, 1989—2 pgs. Article.
Newspaper (unidentifiable) found Jul. 26, 1988 Article.
The Daily News (Durban) Jun. 13, 1987 Article.
Capital—Jun. 1987—Article.
Business Day—Apr. 8. 1986—Article.
European News—Apr. 1986—Article.
Aviation Week and Space Technology Apr. 14, 1986 —Article.
Aviation Week and Space Tecnhology Aug. 11, 1986—Article.
Newsweek—Aug. 1, 1987—Article.
Technology Review—pp. 43-55—Article.

*Primary Examiner*—Louis J. Casaregola
*Attorney, Agent, or Firm*—Ladas & Parry

[57] ABSTRACT

An engine for an aerospace plane has an inlet in association with which a core member is provided to render the inlet annular. The inlet leads into a combustion chamber and an outlet. The core member houses a rocket engine which, in use, induces ambient air to flow into the inlet at low and even zero speed, thus allowing the combustion chamber and outlet to be operated as a ram jet engine at low and even zero speed. By way of development, the core member houses oxygen liquification means adapted to capture ambient air and to liquify and separate oxygen therefrom. The oxygen is used in the rocket engine and allows the mass of on-board oxygen at take-off to be reduced. This increases the potential payload.

13 Claims, 11 Drawing Sheets

AEROSPACE PLANE AND ENGINE

This is a continuation of copending application Ser. No. 07/657,881 filed on Feb. 19, 1991 (now abandoned) which is a continuation of application Ser. No.: 07/409,411 filed Sep. 18, 1989 (now abandoned).

This invention relates to an aerospace plane and to an engine suitable for use in an aerospace plane.

An aerospace plane is envisaged which will be capable of taking off from ground level, of flying at very high altitudes, and possibly of going into orbit, at hypersonic speeds, i.e. speeds well in excess of sonic speeds, of the order of Mach 5 and faster.

It is envisaged that such a plane will be a commercial plane. It must thus be cost effective in general. Its engine must, inter alia, be capable of operating efficiently from a commercial point of view.

It is important to appreciate that the potential payload of such a plane will at most be a small fraction of its on board fuel load at take-off. The significance of this will become apparent hereinafter.

It is envisaged that such a plane will accelerate through the lower layers of atmosphere to the upper layers of atmosphere (say 100000 feet or 30000 meters and higher) and possibly even go into orbit and will then fly (e.g. glide or coast) to its destination from such high altitude.

No single known aircraft engine is capable of performing under the above conditions, e.g. a turbojet engine is not efficient at hypersonic speeds, or in the upper layers of the atmosphere, and it cannot operate at all in space.

It is an object of this invention to provide an engine suitable for use in an aerospace plane under conditions as mentioned above.

In accordance with the invention, there is provided an engine suitable for use in an aerospace plane, the engine comprising
  a casing including
    at an inlet end, a diffuser,
    downstream of, and in series with the diffuser, an intermediate passage, and
    downstream of, and in series with the intermediate passage, a diverging outlet;
  a hollow aerodynamic core member having an internal cavity, the core member being shaped to have a closed pointed leading end such that it diverges rearwardly from said pointed leading end and the core member having a rearwardly directed outlet which is in communication with the internal cavity; and
  a rocket engine accommodated within the internal cavity of the core member and being operatively in alignment with the rearwardly directed outlet,
  the core member being arranged in association with and in proximity to the diffuser,
  the intermediate passage and leading portion of the diverging outlet being adapted to operate as a combustion chamber.

It is to be appreciated that the engine is a composite engine having an on axis rocket engine associated with the leading end of the composite engine, and, partly annularly around the core member, an engine operating as a ram jet engine at low speed and as a scram jet engine at high speed. Even the rocket engine may be a composite rocket engine of cluster design, e.g. comprising a plurality of rocket engine units arranged in a symmetric cluster. Operation of the ram jet engine is made possible by induction of ambient air via the diffuser into the combustion chamber by operation of the rocket engine. The Inventor envisages that the rate of induction will be substantially more than the mass flow of rocket exhaust gases, as much as about 1000% more under favourable conditions. If desired, a disposable induction turbo fan may be provided comprising a turbine arranged to be driven by the rocket exhaust gases and an associated fan arranged to draw ambient air into the combustion chamber. The engine may be adapted to jettison the turbo fan when the plane has attained a predetermined speed, for example about MACH 1.

Advantageously, the diffuser may be adjustable to vary its inlet configuration.

In one embodiment, the core member may axially be movable between an extended forward and a retracted rearward position in which, respectively, the pointed leading end is axially well proud of a leading end of the diffuser and is retracted to about the axial position of the leading end of the diffuser.

If desired, for use during take-off and landing, and when operating at low speed, the engine may further comprise a turbo-jet engine annularly within the casing and around the combustion chamber. An inlet diffuser of the turbo-jet engine may lead out of the diffuser, and an outlet of the turbo-jet engine may be directed into said diverging outlet.

By way of development, the engine may further comprise a secondary ambient air inlet, oxygen liquifying means which is arranged to receive flow of ambient air from the secondary inlet, which is adapted to liquify oxygen for combustion from the ambient air and to separate it from the balance of the ambient air, and means for introducing the oxygen for combustion into the rocket engine. The balance of the ambient air will contain mainly nitrogen and possibly some oxygen in gas form.

This development will allow the amount of oxygen carried by the aerospace plane to sustain combustion in the rocket engine to be reduced. It is important to realize that the ratio of payload to mass of fuel and oxygen at take-off is small. Thus, even a small percentage saving in oxygen to be carried has the potential of amplifying the payload substantially without affecting the take-off mass of the plane. thus, marginal savings in oxygen which is carried by the plane are significant.

The oxygen liquifying means may comprise a plurality of heat exchangers arranged in series and such as to utilize as cooling fluids respectively fuel from a fuel reservoir and said oxygen for combustion. The fuel and oxygen will be directed via the heat exchangers to the rocket engine and combustion chamber for the ram/-scram jet engine.

The liquifying means may further comprise an expansion turbine arranged to receive and to expand the ambient air to lower its temperature, and a pressurizing machine, e.g. a compressor or pump, drivingly connected to the expansion turbine and arranged to pressurize fuel for introduction into the combustion chamber. If desired, the expansion turbine may drivingly be connected also to other power consuming machines.

The liquifying means may yet further comprise a further heat exchanger downstream of said plurality of heat exchangers, which further heat exchanger is arranged to be driven by said balance of the ambient air.

Further by way of development, the liquifying means may comprise an ambient air compressor upstream of and drivingly connected to the expansion turbine to pressurize the ambient air and an intercooler intermediate said ambient air compressor and the expansion turbine to cool the pressurized ambient air prior to entering the expansion turbine. The intercooler may be arranged to be driven by fuel en route to one of the heat exchangers.

The invention extends to a method of operating an engine suitable for use in an aerospace plane as herein described, the method including when moving at low speed, inducing ambient air into the diffuser by operating the rocket engine, and operating the diffuser and the combustion chamber as a ram jet engine;

when moving at medium speed below a predetermined speed, operating the diffuser and the combustion chamber as a ram jet engine utilizing ram effect on account of the speed;

when moving at medium speed above the predetermined speed, operating the diffuser and combustion chamber as a scram jet engine;

when moving at high speed and at very high altitude, e.g. higher than about 100 000 feet, generating propulsion mainly by means of the rocket engine.

It is of significance that the configuration proposed by the Inventor allows ram jet operation at low speed and even when stationary. This configuration thus allows two types of engines which are inherently adapted for high speed operation to be combined to form a low speed propulsion unit.

The method advantageously includes utilizing the rocket engine as a flame holder.

When the core member is extendable and retractible, the method advantageously includes when moving at low speed, inducing ambient air into the diffuser by operating the rocket engine, and operating the diffuser and the combustion chamber as a ram jet engine, the diffuser being at least near maximally open and the core member being at least near its most extended position;

when moving at medium speed below a predetermined speed, operating the diffuser and the combustion chamber as a ram jet engine utilizing ram effect on account of the speed, the diffuser being toward its maximally open position and the core member being toward its most extended condition;

when moving at medium speed above the predetermined speed, operating the diffuser and the combustion chamber as a scram jet engine, the core member being retracted to an intermediate position, and the diffuser being adjusted to sustain an oblique shock wave at an angle smaller than 45° (say about 35° at Mach and about 13° at Mach) formed between the leading end of the core member and the mouth of the inlet, the angle decreasing with increasing speed and at least one of the diffuser and the axial position of the core member being continually adjusted suitably to sustain the shock wave;

when moving at high speed and at very high altitude, e.g. higher than about 100 000 feet, generating propulsion mainly by means of the rocket engine, the diffuser being adjusted to a minimum opening and the core member being fully retracted.

In a developed embodiment, the applicant, however, envisages that the diffuser will not act as a diffuser in the true sense of the word. Instead, the inlet mouth will coincide in respect of axial position approximately with the rear of the core member. The oblique shockwave at said small angle will be formed between the structural leading end of the core member and the mouth of the inlet. The mouth of the inlet may be adjustable to enable the structural configuration to be matched to the shock front. Decrease in speed takes place over the shockwave. The "diffuser" then acts merely as a passage for primary air induced by operation of the rocket engine which actually does the compression. The nozzle of the rocket engine may be fluted to increase the interface between rocket engine exhaust flow and primary air flow and to ensure a straighter flow path for a large proportion of the primary air. This may be effected by means of a composite rocket engine comprising a plurality of rocket engines arranged in a cluster or in sectors as mentioned above. This configuration will facilitate throttling the rocket engine, e.g. by taking some of the rocket engines out of operation which will allow the scram jet engine to function optimally. The scram jet engine can then aspirate more air on its own, without augmentation by the rocket engine. This will contribute to good economics of the engine at high Mach numbers.

For subsonic speed, the flow at the inlet of the outlet nozzle is about sonic speed. For flying speeds higher than Mach 1, flow speed at that point will approximate the flying speed, i.e. supersonic combustion then takes place.

Combustion takes place also in the outlet nozzle, which acts in the manner of a tail burner as combustion is allowed to continue through the nozzle. Expansion in the nozzle is isothermal or even hyperthermal.

By way of development, the method may include inducting ambient air, liquifying oxygen for combustion from the ambient air and separating it from the balance of the ambient air and introducing said oxygen for combustion into the rocket engine.

Liquifying the oxygen may include reducing the temperature of the air by means of heat exchanger means and expanding the air of reduced temperature in an expansion turbine to a liquification condition. When the heat exchanger means is in the form of a plurality of series arranged heat exchangers, the method may include driving the heat exchangers respectively with the oxygen for combustion, and with fuel pumped from a fuel reservoir to at least one of the rocket engine and the combustion chamber for the ram/scram jet engine.

The method may include compressing said fuel downstream of the heat exchanger by means of a compressor driven from the expansion turbine.

The method may advantageously include driving a further heat exchanger downstream of the earlier mentioned heat exchanger by means of said balance of the ambient air. This will further reduce the temperature of the air at the inlet of the expansion turbine and will allow a larger percentage of the available oxygen to be liquified which translates into a larger saving in oxygen carried by the plane at take-off.

Further by way of development, the method may include compressing the ambient air and then intercooling it prior to inducting the ambient air into the expansion turbine. Said intercooling may be effected by means of said fuel pumped from the fuel reservoir prior to driving the heat exchanger therewith. Advantageously, the ambient air may be compressed by means of a compressor driven by the expansion turbine.

The fuel may be selected from the group consisting of methane, a mixture of methane and hydrogen, and hydrogen. The component or one of the components of the fuel may advantageously be in the form of slush, i.e.

the fuel may be nominally at the triple point of the respective component.

The invention is now described by way of example with reference to the accompanying diagrammatic drawings. In the drawings FIGS. 1 to 5 show, in axial section, schematically, a first embodiment of an aerospace engine in accordance with the invention;

Figure 1:
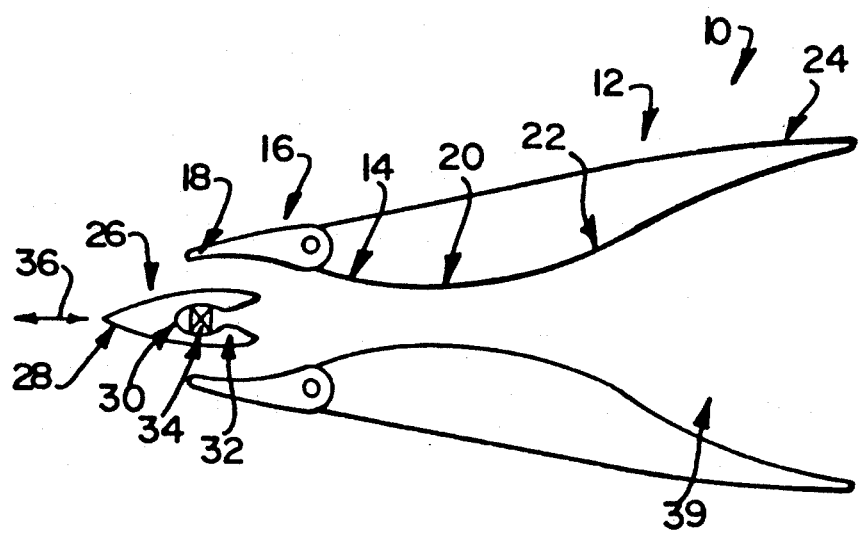
Figure 11:
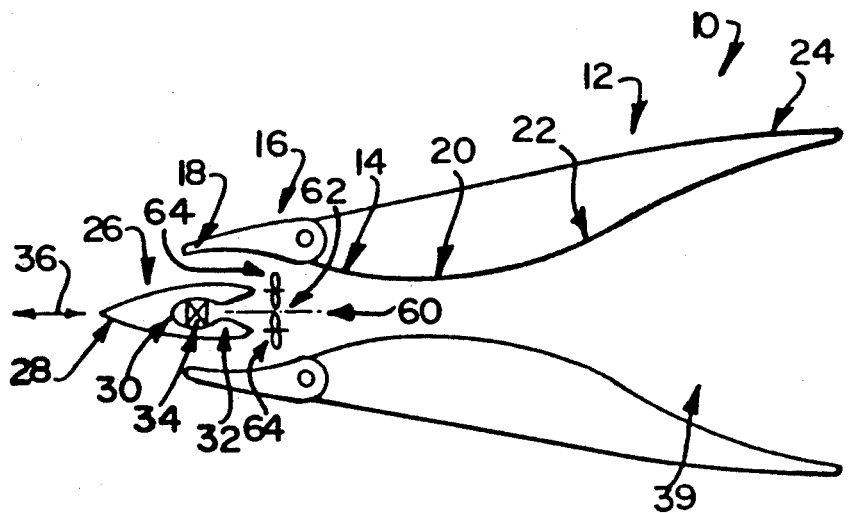
Figure 12:
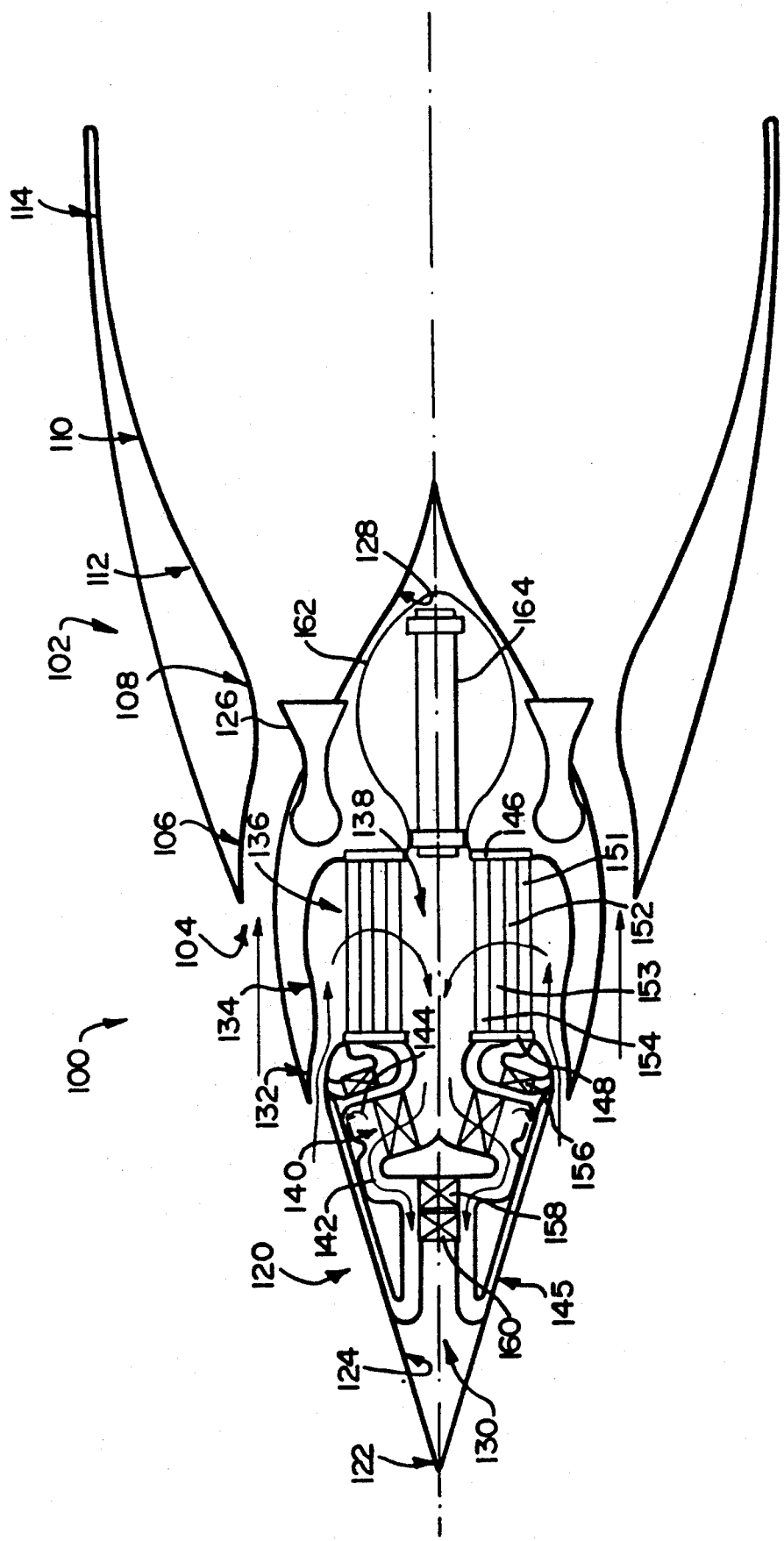
Figure 13:
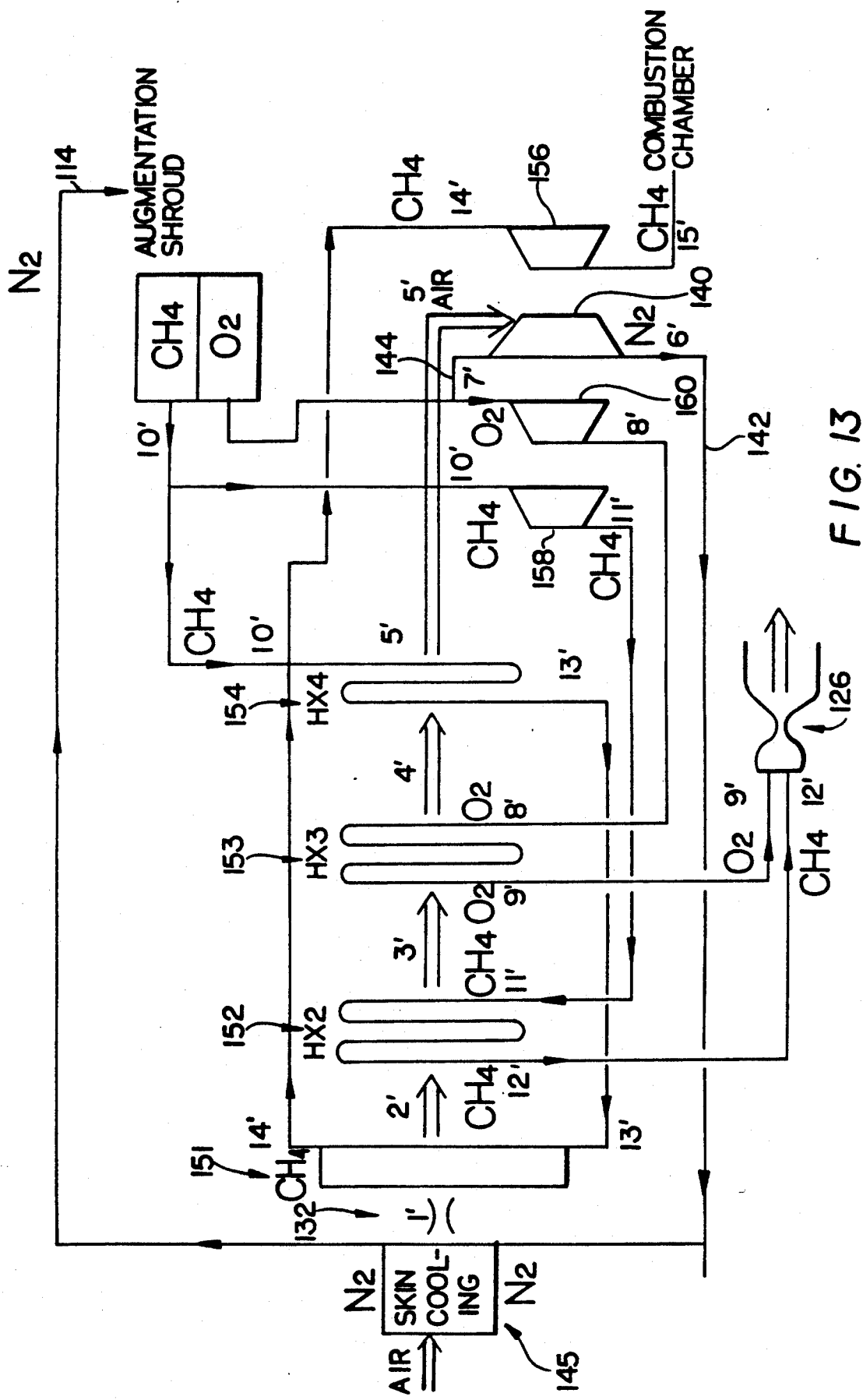
Figure 14:
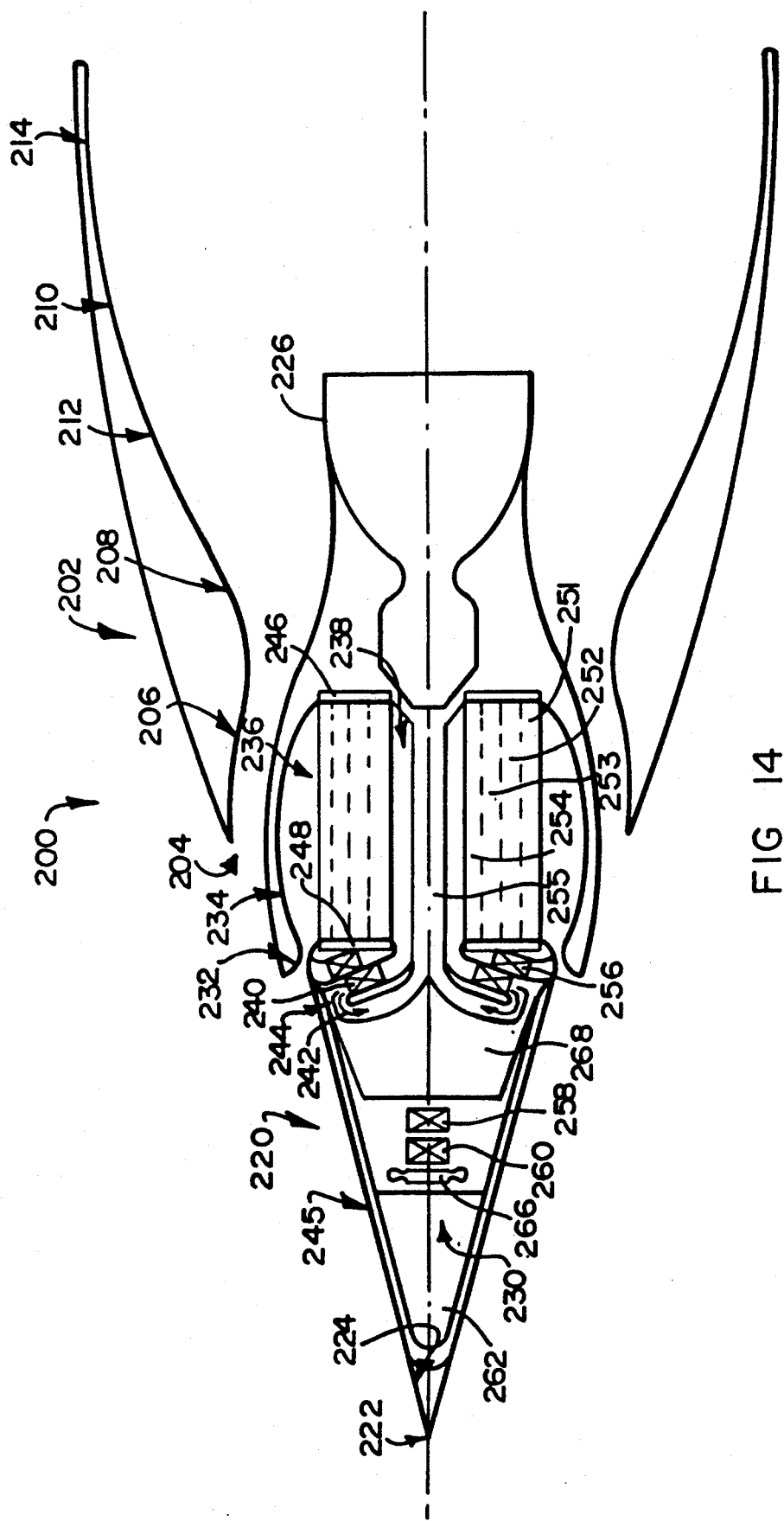
Figure 15:
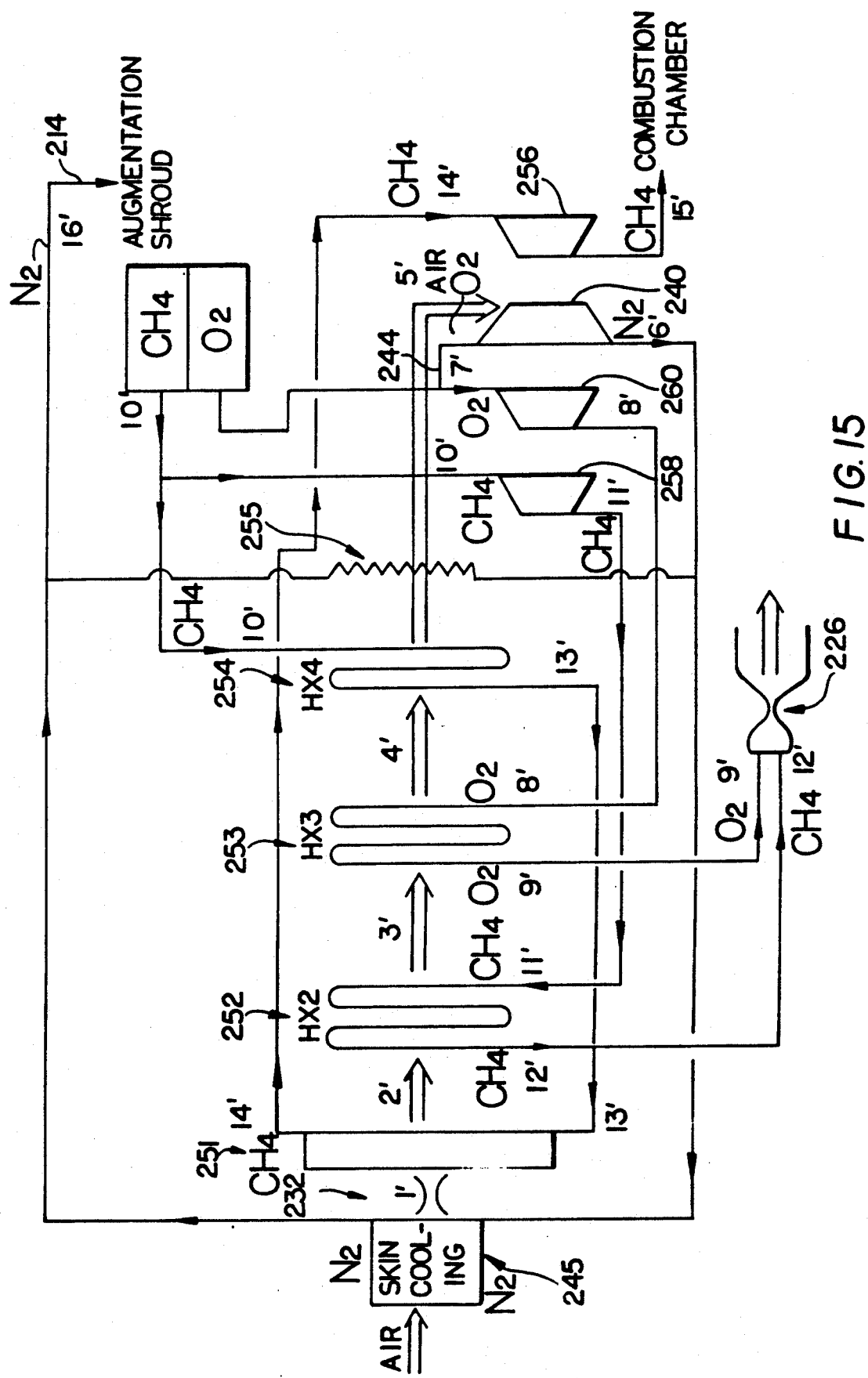
Figure 16:
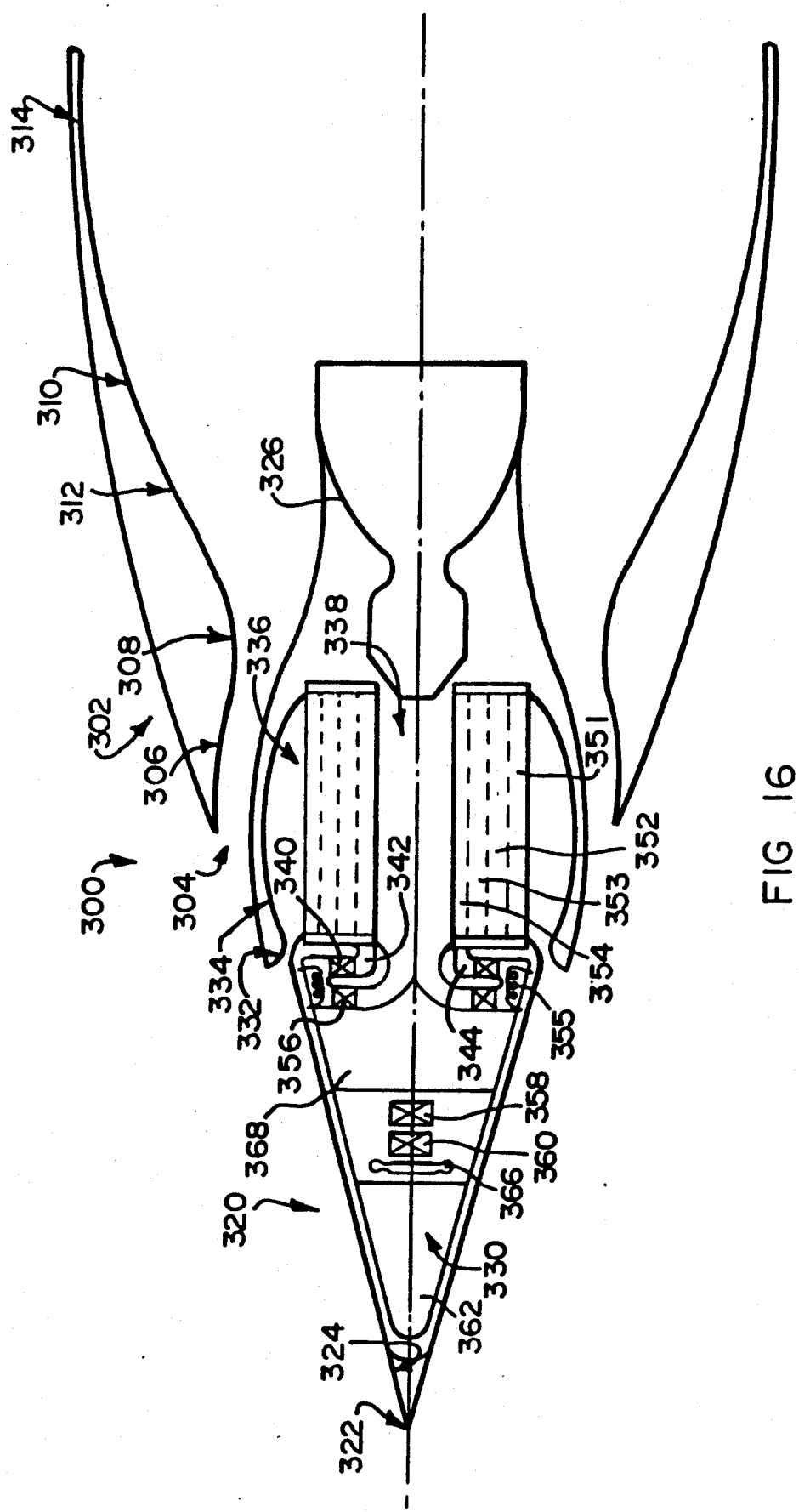
Figure 17:
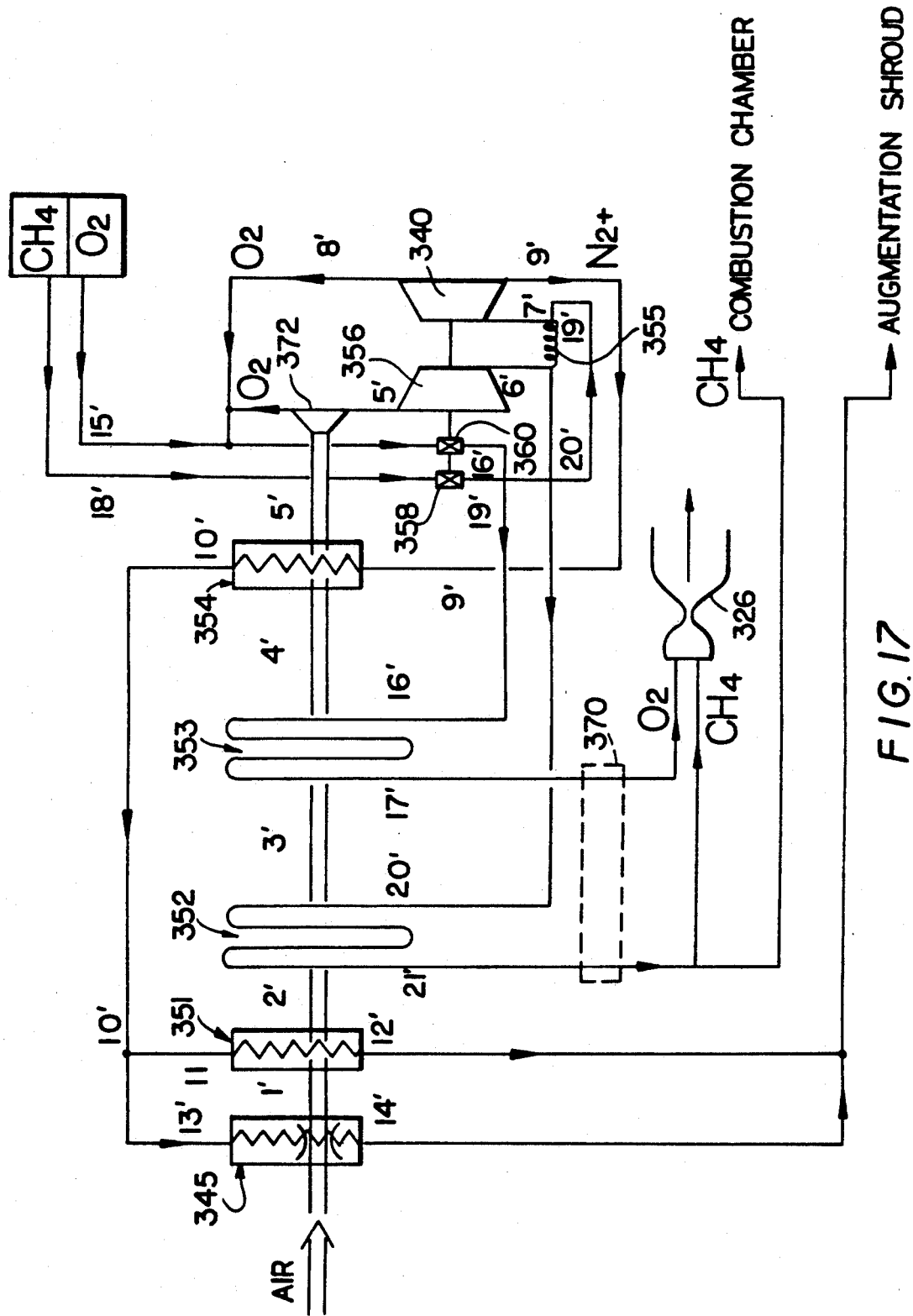
Figure 18:
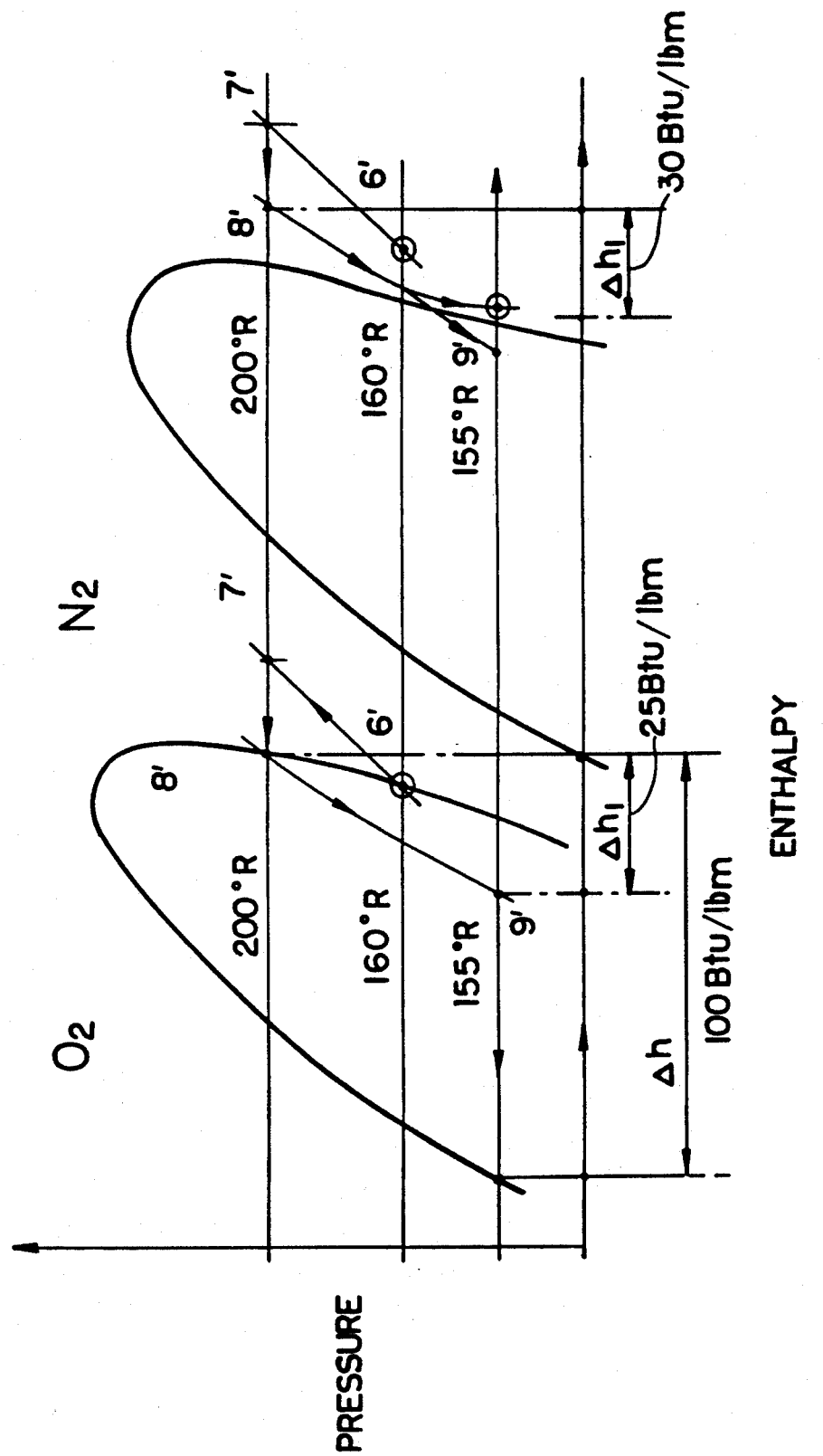

FIG. 11 corresponds to FIG. 1 and shows a development to the embodiment of FIG. 1;

FIGS. 12 and 13 show, respectively, schematically a developed embodiment of an aerospace engine in accordance with the invention, and a flow diagram for such engine;

FIGS. 14 and 15 correspond respectively to FIGS. 12 and 13 but are in respect of a further developed engine;

FIGS. 16 and 17 also correspond respectively to FIGS. 12 and 13 but are in respect of yet a further developed engine; and FIG. 18 shows enthalpy diagrams for oxygen and nitrogen on which some aspects of the operation of the engine of FIGS. 16 and 17 are shown.

It is to be appreciated that the drawings are schematic or in diagram form. Thus, for example, although the drawings are in section, no hatching is shown.

With reference to FIGS. 1 to 5 of the drawings, an aerospace engine in accordance with the invention is generally indicated by reference numeral 10. The aerospace engine 10 has a body or casing 12.

At one end of the casing 12, which will be a leading end in use, it defines a diffuser 14. The diffuser 14 comprises an annular adjustable lip portion 16 and means to move the lip portion 16 to adjust the configuration of the diffuser 14. A leading annulus 18 is defined at the leading end of the adjustable lip portion 16.

Rearwardly of the diffuser 14, there is provided a narrow, intermediate passage or throat portion 20.

The intermediate passage 20 leads into a diverging outlet nozzle 22 having a long trailing portion 24.

The aerospace engine 10 further comprises, in association with the diffuser 14, an axially positioned core member 26. The core member 26 is of aerodynamic shape having a pointed leading end 28 and it diverges rearwardly of the leading end 28. The core member 26 is further of hollow construction having an internal cavity 30 and, at its trailing end, an outlet nozzle 32 leading from the internal cavity 30 and being of predetermined configuration.

A rocket engine diagrammatically indicated at 34 is accommodated within the internal cavity 30 and is operatively in alignment with the outlet nozzle 32.

The aerospace engine 10 further has means, which are not shown, adapted to displace the core member 26 and rocket engine 34 axially forwardly and rearwardly within limits as indicated at 36.

The intermediate passage 20 and the outlet nozzle 22 define a combustion chamber indicated at 39.

It is to be appreciated that the aerospace engine 10 is a composite engine having the rocket engine 34 on its axis and associated with its leading end, and, partially annularly around the rocket engine 34, a ram jet engine or scram jet engine.

FIG. 1 shows the configuration of the adjustable lip portion 16 and the position of the core member 26 when the aerospace engine is ready for take-off i.e. at zero speed. The core member 26 is at its foremost position and the adjustable lip portion 16 is at its maximum opening. The rocket engine 34 is brought into operation. Its operation causes gas to exit via the outlet nozzle 32 through the rear part of the diffuser 14 and through the rest of the engine. The fast moving gases induce, jet pump fashion, ambient air to flow past the leading annulus 18 and the diffuser 14 to be introduced into the gas stream of the rocket engine 34. Thus, the ram jet engine can start to operate even at zero speed as ram is induced into the ram jet engine by means of the rocket engine.

It is to be appreciated that the induction of ambient air into the engine by operation of the rocket engine 34, increases the mass flow through the engine 10 at the expense of speed which enhances the thrust efficiency of the rocket engine 34.

Figure 2:
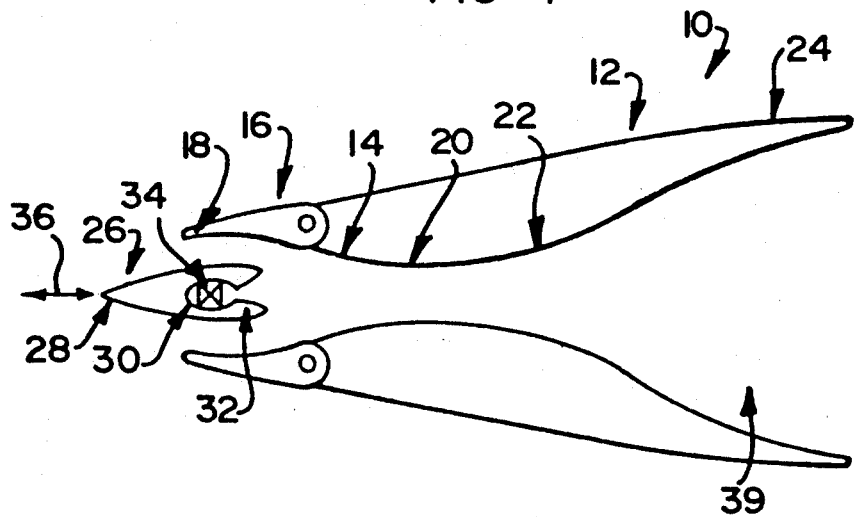

FIG. 2 illustrates the condition of the engine 10 at low speeds, for example subsonic speeds such as at about Mach 0,75 and at low altitude e.g. between 10000 and 30000 feet (approximately 3000 to 9000 meters). The operation is substantially the same as was described for FIG. 1. The adjustable lip portions 16 may be moved to a smaller configuration to optimize performance of the engine. The core member 26 will still be at its forward position to ensure induction of ambient air into the diffuser 14. The rocket engine 34 will still be in operation. It is to be appreciated that ram effect will be obtained on account of the speed of the engine and on account of induction by means of the rocket engine.

Subsonic combustion takes place in the combustion chamber 39. The speed at a position where the throat portion 20 goes over into the outlet nozzle 22 is about sonic speed.

Figure 3:
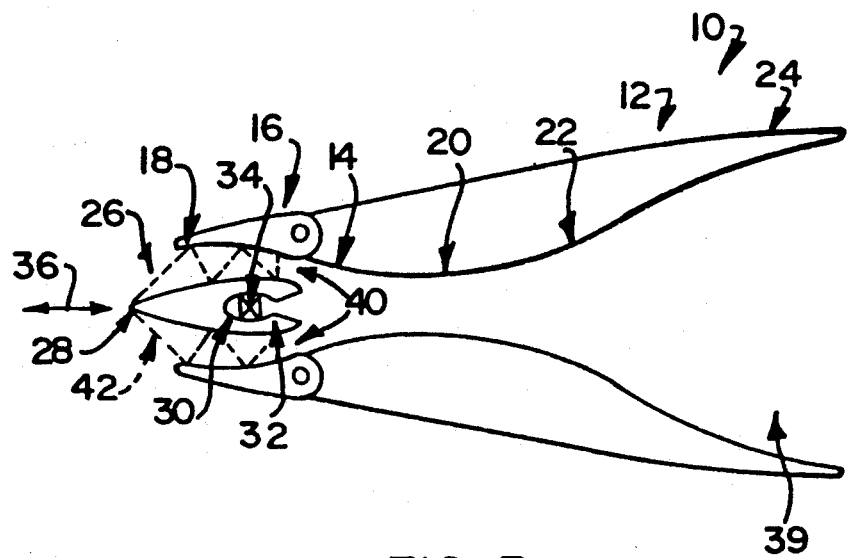

FIG. 3 illustrates the condition of the engine 10 at supersonic speeds such as at Mach 2.5 and at an altitude of about 50000 feet, i.e. about 15000 meters.

At that speed, the scram jet engine and the rocket engine operate in synergy to accelerate the plane.

The diffuser does not act as a diffuser in the true sense of the word. Instead, the inlet mouth coincides in respect of axial position approximately with the rear of the core member. An oblique shockwave at a small angle (say between about 35° at low Mach number to about 13° at high Mach number) is formed between the structural leading end of the core member and the mouth of the inlet. The mouth of the inlet is adjusted to enable the structural configuration to be matched to the shock front. Decrease in speed takes place over the shockwave. The "diffuser" then acts merely as a passage for primary air induced by operation of the rocket engine which actually does the compression. The nozzle of the rocket engine, in a preferred embodiment, is fluted to increase the interface between rocket engine exhaust flow and primary air flow and to ensure a straighter flow path for a large proportion of the primary air. This is effected in some embodiments by means of a composite rocket engine comprising a plurality of rocket engines arranged in a cluster or in sectors. This configuration will facilitate throttling the rocket engine, e.g. by taking some of the rocket engines out of operation which will allow the scram jet engine to function optimally. The scram jet engine can then aspirate more air on its own, without augmentation by the rocket engine. This will contribute to good economics of the engine at high Mach numbers.

Figure 4:
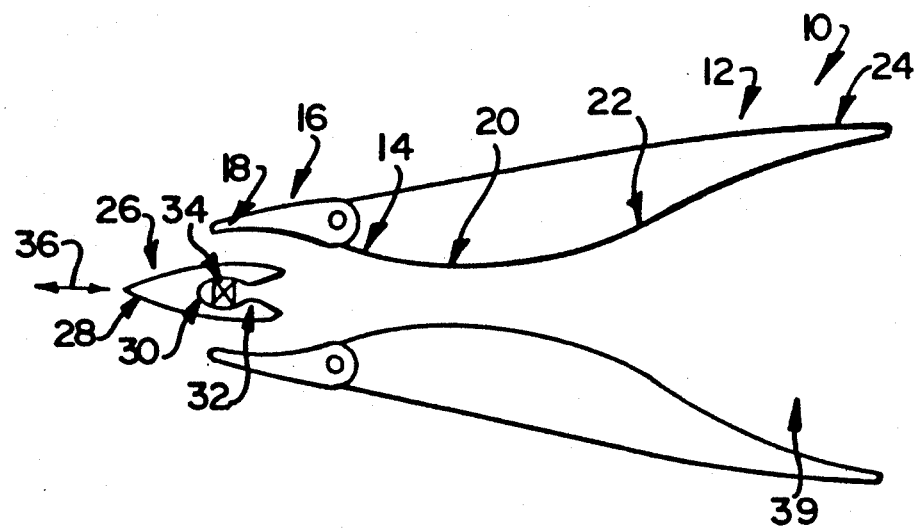

FIG. 4 illustrates the condition of the engine at hypersonic speed, e.g. at about Mach 10 and at high altitude e.g. at about 100 000 to 150 000 feet (about 30000 to 45000 meters).

The core member 26 is at its foremost position and the adjustable lip portion 16 is at its minimum opening. Both the scram jet engine and the rocket engine operate and supersonic combustion takes place in the combustion chamber 39. In this regard, the Applicant believes that it will be possible to have the combustion chamber sufficiently long (thus the exceptionally long divergent nozzle 24) to allow combustion to be sustained by using ordinary hydrocarbon fuels as opposed to hydrogen.

Figure 5:
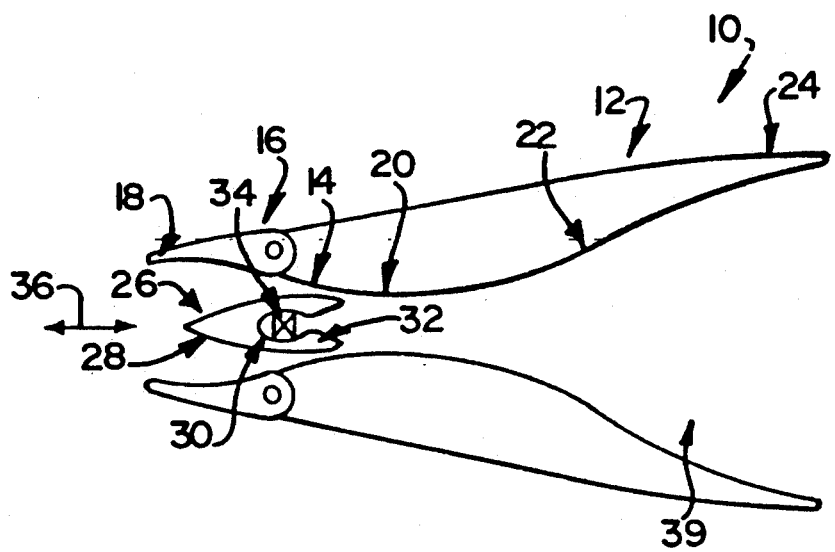

FIG. 5 shows the aerospace engine in its condition for operating in space. The scram jet engine is not operative at all and only the rocket engine 34 is operative. The core member 26 is at its rearmost position and the outlet nozzle 32 directs gases directly into the intermediate passage 20. Expansion only and no combustion takes place in the combustion zone 39.

Figure 6:
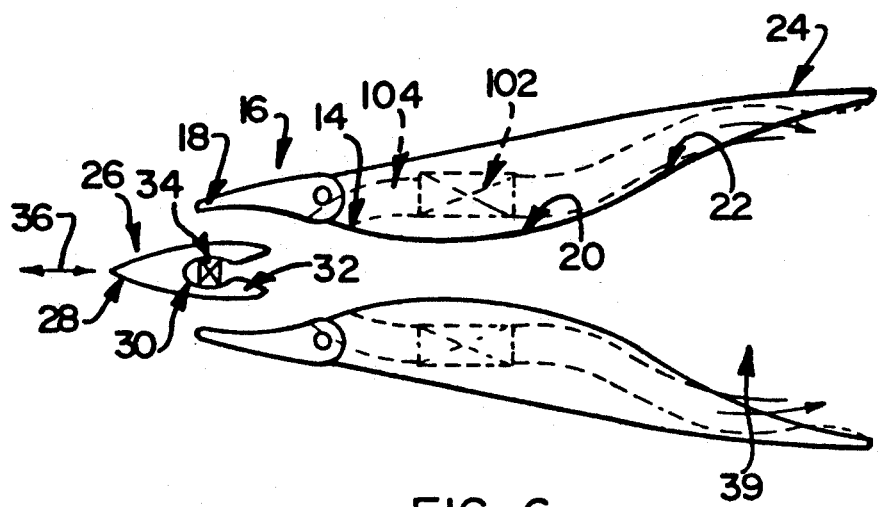
FIG. 6 shows, in axial section, schematically, another embodiment of an aerospace engine in accordance with the invention.

With reference to FIG. 6, another embodiment of an aerospace engine in accordance with the invention is generally indicated by reference numeral 100. The aerospace engine 100 is basically the same as the aerospace engine 10 except that, annularly around the intermediate passage 20, there is provided a turbo-jet engine generally indicated at 102. It has a diffuser 104 leading out of the diffuser 14 and leading into a compressor, a combustion chamber and flame holders 110 rearwardly of the compressor and a turbine rearwardly of the combustion chamber. An after-burner section and outlet nozzle are at the trailing end of the turbo-jet engine.

The turbo-jet engine 102 may enhance operating efficiency, especially in respect of economy, of the aerospace engine 10 at low speeds.

Figure 10:
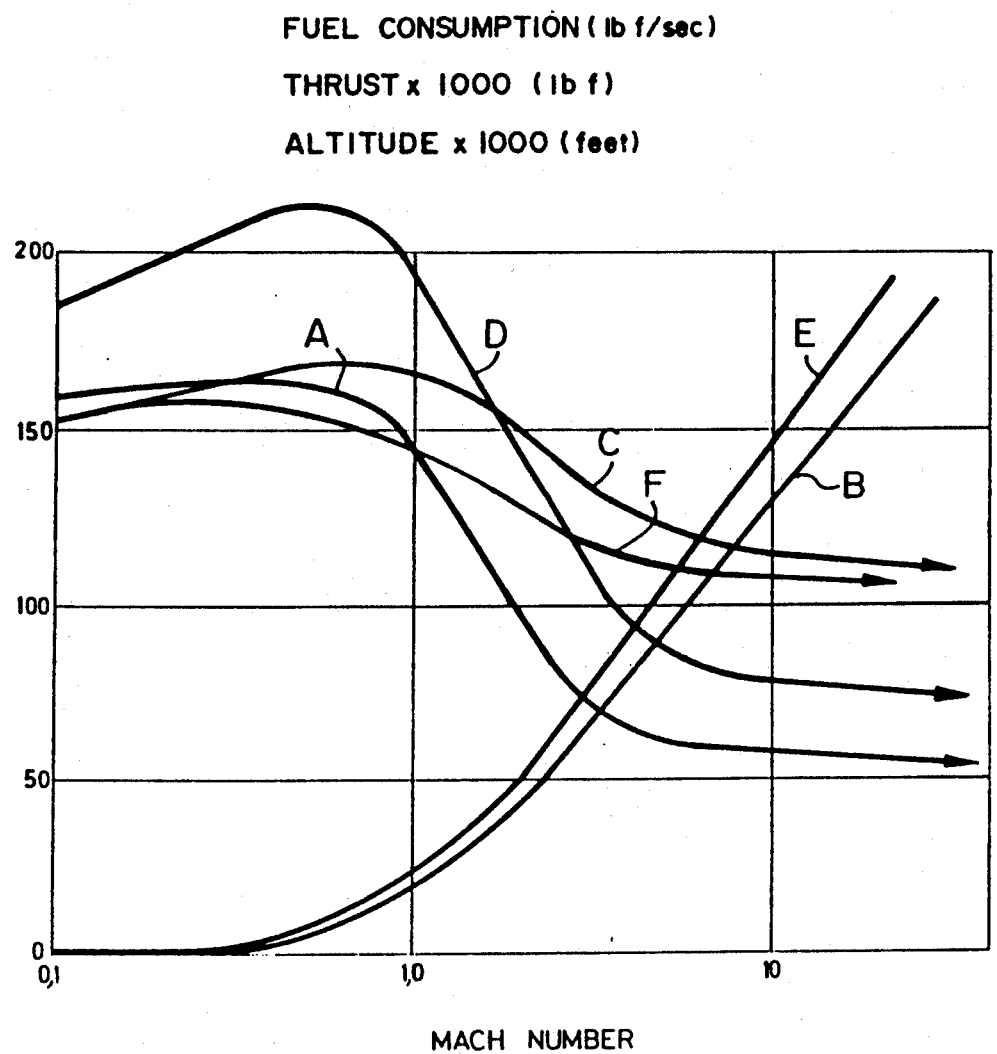
FIG. 10 shows, graphically, performance of an aerospace plane in terms of thrust and altitude against speed.

The Applicant has performed theoretical calculations to obtain projected performance characteristic of an aerospace engine in accordance with the invention. The results of the calculations are graphically represented in FIG. 10. Respectively altitude, thrust and rate of fuel consumption are plotted against speed, for each of two conditions.

In a first condition, plotted at A in respect of thrust and at B in respect of altitude and at C in respect of fuel consumption, both the rocket engine and the ram jet/scram jet engine were fuelled by hydrocarbon fuel. In a second condition, plotted at D in respect of thrust and at E in respect of altitude and at F in respect of fuel consumption, the rocket engine was hydrogen fuelled and the ram jet/scram jet engine was fuelled by hydrocarbon fuel.

Below, in a first table calculated values for effective diameter, flow area, mach number, pressure and temperature for a number of axial stations in the engine, and in respect of different altitudes, are listed. Station 0' is at the engine inlet, Station 6' is at the actual constructional engine outlet, Station 6" is at an effective engine outlet formed between an afterbody of the aerospace plane and a shock wave, and Stations 1' to 4' are intermediate Stations 0' and 6'.

TABLE I

| STATION | DIAMETER (ft) | AREA (ft²) | MACH NO. | PRESSURE (PSI) | TEMPERATURE (°R.) |
|---|---|---|---|---|---|
| Altitude: 0 ft | | | | | |
| 0' | 5 | 20 | 0.0 | 14.7 | 518 |
| 1' | 6 | 25 | 0.5 | 12.5 | 495 |
| 2' | 5 | 19 | 0.8 | 10.4 | 479 |
| 3' | 2 | 3 | 0.8 | 173 | 1186 |
| 4' | 3 | 7 | 1.0 | 164 | 3000 |
| 6' | 4 | 10 | 3.8 | 14.7 | 1506 |
| 6" | 5 | 20 | 4.3 | 14.7 | 3500 |
| Altitude: 0 ft | | | | | |
| 0' | 5 | 20 | 0.3 | 14.7 | 518 |
| 1' | 6 | 25 | 0.5 | 13.0 | 500 |
| 2' | 5 | 20 | 0.8 | 10.5 | 482 |
| 3' | 2 | 4 | 0.8 | 146 | 1132 |
| 4' | 3 | 8 | 1.0 | 139 | 3000 |
| 6' | 4 | 11 | 3.7 | 14.7 | 1578 |
| 6" | 5 | 23 | 4.2 | 14.7 | 3500 |
| Altitude: 70000 ft | | | | | |
| 0' | 3 | 5 | 3.4 | 0.71 | 392 |
| 1' | 6 | 28 | 3.2 | 1.21 | 470 |
| 2' | 6 | 32 | 3.2 | 1.18 | 523 |
| 3' | 3 | 7 | 4.1 | 9 | 1083 |
| 4' | 5 | 20 | 4.1 | 9 | 3000 |
| 6' | 5 | 20 | 4.1 | 0.71 | 1455 |
| 6" | 15 | 182 | 6.7 | 0.71 | 3500 |
| Altitude: 150000 ft | | | | | |
| 0' | 3 | 5 | 14.5 | 0.01 | 575 |
| 1' | 7 | 34 | 14.1 | 0.31 | 1897 |
| 2' | 7 | 43 | 14.1 | 0.38 | 2108 |
| 3' | 5 | 19 | 12.2 | 1 | 3084 |
| 4' | 5 | 19 | 12.2 | 1 | 3000 |
| 6' | 5 | 19 | 12.2 | 0.01 | 1241 |
| 6" | 40 | 1231 | 13.4 | 0.01 | 3500 |
| Altitude: 200000 ft | | | | | |
| 0' | 3 | 5 | 16.0 | 0.01 | 623 |
| 1' | 6 | 28 | 15.5 | 0.11 | 2180 |
| 2' | 6 | 31 | 15.5 | 0.18 | 2423 |
| 3' | 6 | 27 | 9.80 | 1 | 3992 |
| 4' | 5 | 20 | 9.80 | 1 | 3000 |
| 6' | 5 | 20 | 9.80 | 0.01 | 1079 |
| 6" | 55 | 2375 | 11.3 | 0.01 | 3500 |

From the table, it appears that some of the areas vary. The areas at Stations 0' to 3' can be varied by one of or a combination of adjusting the diffuser 16 and moving the core member 26 axially. The areas at Stations 4' and 6' can be varied by adjustment of the configuration of the outlet nozzle, or by creating a bypass facility, as will be described with reference to respectively FIG. 7 and FIG. 8. The area at Station 6" is dictated automatically by the flow dynamics as will be described with reference to FIG. 9.

In a second table, against Mach number, there are tabled values for a number of variables which are specified in the table.

TABLE II

| MACH NO. | ALT × 1000 ft | THRUST × 1000 lb | FUEL + O₂ lb/sec | RESIDUUM MASS × 1000 lb | TOTAL TIME sec. | DISTANCE miles |
|---|---|---|---|---|---|---|
| 0.0 | 0 | 185 | 153 | 250 | — | — |
| 1.0 | 20 | 197 | 161 | 232.7 | 105 | 15 |
| 2.5 | 52 | 125 | 143 | 202.7 | 298 | 85 |

TABLE II-continued

| MACH NO. | ALT × 1000 ft | THRUST × 1000 lb | FUEL + O$_2$ lb/sec | RESIDUUM MASS × 1000 lb | TOTAL TIME sec. | DISTANCE miles |
| --- | --- | --- | --- | --- | --- | --- |
| 5.0 | 91 | 90 | 123 | 156.0 | 631 | 324 |
| 10.0 | 130 | 83 | 111 | 97.6 | 1061 | 972 |
| 15.0 | 152 | 79 | 109 | 61.6 | 1371 | 1,685 |
| 20.0 | 170 | 75 | 107 | 37.8 | 1562 | 2,357 |

Figure 7:
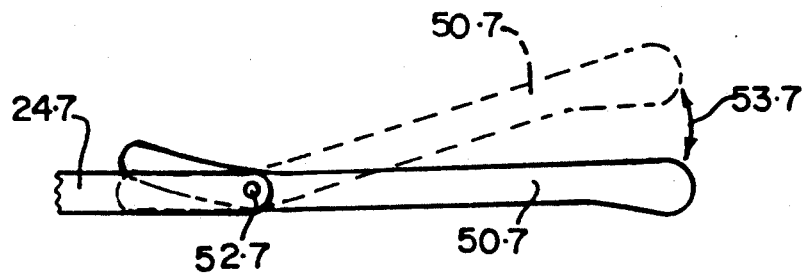
FIG. 7 shows, to a larger scale, fragmentarily, adjustment means for adjusting the area of an outlet nozzle of another embodiment of an aerospace engine in accordance with the invention.

With reference to FIG. 7, a rear portion of the outlet nozzle 24 is indicated by reference 24.7. At a downstream end thereof, there are provided a plurality of circumferentially arranged adjusting petals of which only one is indicated by reference numeral 50.7. The petal 50.7 can be arranged to have an outlet nozzle area which is small, such as indicated in solid outlines. The petals can be adjusted to enlarge the nozzle outlet area as indicated in dotted outlines. Each petal is hinged as indicated at 52.7 to the shell 24.7 and can be pivoted as indicated at 53.7. It is to be appreciated that the outlet nozzle is essentially a divergent nozzle. Thus, adjustment is in respect of divergence of the nozzle.

Figure 8:
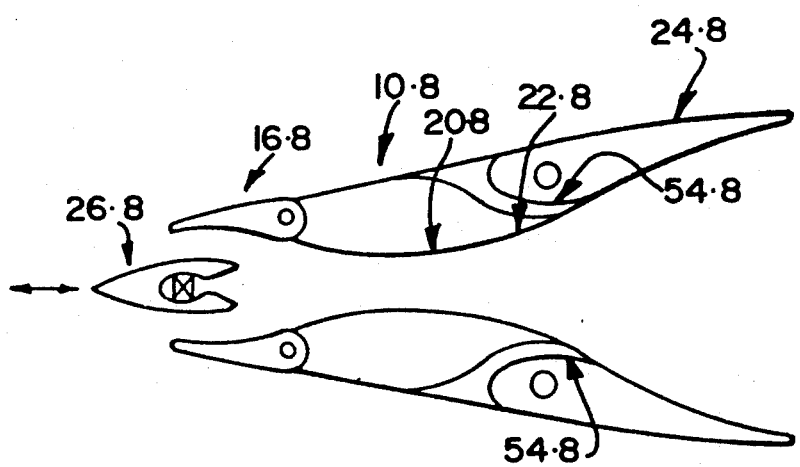
FIG. 8 shows, in a view corresponding to FIGS. 1 to 6, yet another embodiment of an aerospace engine.

With reference to FIG. 8, an aerospace engine in accordance with the invention is generally indicated by reference numeral 10.8. Its outlet nozzle 24.8 has, intermediate the portion 22.8 and the exit end of the outlet nozzle, a bypass opening which is in the form of a plurality of circumferentially arranged passages 54.8. In use, air flowing around the engine 10.8 is induced via the passages 54.8 into the outlet nozzle which effectively increases the outlet area of the nozzle as it enables the whole of the length of the nozzle to be utilized for combustion, tail burner fashion.

Figure 9:
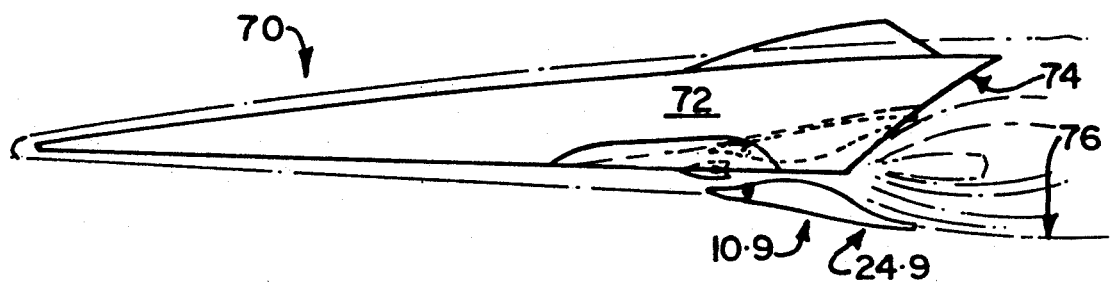
FIG. 9 shows, in side view, an aerospace plane having an aerospace engine in accordance with the invention.

With reference to FIG. 9, an aerospace plane is generally indicated by reference numeral 70. It has one or more aerospace engines in accordance with the invention one of which is generally indicated by reference numeral 10.9. The plane 70 has a body 72 having an after body with a concave surface indicated at 74. The outlet nozzle 24.9 of the engine 10.9 is arranged relatively to the after body and the surface 74 such that the surface 74 co-operates with a shockwave indicated at 76 effectively to enlarge the outlet nozzle and thus also its exit area. It thus acts as an augmentation shroud to reclaim pressure.

It is a first advantage of an aerospace engine in accordance with the invention that it has a rocket arranged in association with an upstream or fore end of the engine. This enables substantial amounts of air to be induced by operation of the rocket into the engine and enables ram operation even at low or zero speed.

It is a second advantage of an aerospace engine that mixing of primary air with fuel is enhanced. Thus, the rocket engine enhances carburretion and promotes destratification of air and air/fuel mixture.

Operation of the rocket engine sustains combustion of the ram jet/scram jet engine. Thus, it is believed that flame holders will not be required.

The advantages of enhanced carburretion and promotion of destratification as well as sustaining of combustion by means of operation of the rocket engine coupled with the particularly long exhaust nozzle of the engine allow the engine to be operated on hydrocarbon fuels even at supersonic speeds of gas flow through the engine. The Applicant believes that this is a major advantage because hydrocarbon fuels are much easier to handle than hydrogen. If desired, the rocket engine may be operated on hydrogen and the ram jet/scram jet engine may be operated on hydrocarbon fuel.

It is believed that the use of a rocket engine to induce primary air for the ram jet engine will obviate the use of a turbo-jet engine. This will simplify the construction and design of the aerospace engine. It is expected that development cost and time will be saved, that manufacturing cost and time will be saved and that maintenance will be simplified and costs will be decreased.

The simplified and compact nature of the aerospace engine enables it to be used in clusters around or partially around an aerospace plane body. It also facilitates providing the rocket engine in the form of a composite rocket engine of clustered or split design having the advantages described earlier.

FIG. 11 shows a developed version of the embodiment of FIG. 1. The components and features of FIG. 1 are numbered as in FIG. 1 and are not repeated.

It is to be appreciated that proper operation of the aerospace engine 10 depends from induction of ambient air via the diffuser 18 by operation of the rocket engine 34. To enhance such induction, the development of FIG. 11 may be employed. In FIG. 11, a turbo-fan 60 is shown downstream of the rocket engine 34 and in association with the diffuser 18 or intermediate passage 14. The turbo fan comprises a turbine 62 aligned with the outlet 32 of the core member so as to be driven in use by exhaust gases of the rocket engine 34, and an annular fan 64 arranged to draw ambient air via the diffuser 18 into the combustion chamber for the ram/scram engine.

It is to be appreciated that the turbo fan unit 60 will serve a useful function only during take-off and at low speed say up to about Mach 1. Above a predetermined speed, the turbo fan unit 60 will cease to enhance operation of the engine 10 and will ultimately detract from the operation of the engine 10. Thus, the turbo fan unit 60 may be disposable and may have to be eliminated when the predetermined speed has been reached. It can be eliminated by having it jettisoned at said predetermined speed. Instead, or in addition, it can be manufactured such and of materials such that it will be burnt away at about said predetermined speed.

It was mentioned above that the payload of an aerospace plane of the kind to which this invention relates is typically a small fraction of the on-board fuel and oxygen load of the aerospace plane at take-off. It is repeated that a marginal saving in the mass of on-board fuel or oxygen at take-off has the potential of increasing the possible payload substantially. A development of the invention has in mind capturing ambient air in flight and liquifying oxygen from such ambient air for use in the rocket engine thus providing a corresponding saving in on-board oxygen at take-off. A first embodiment of an aerospace engine in accordance with the invention and having the abovementioned advantage is now described with reference to FIGS. 12 and 13.

Such development embodiment of an aerospace plane in accordance with the invention is generally indicated by reference numeral 100. It comprises a casing 102 having a main inlet 104 defined by an annular diffuser 106. The annular diffuser 106 blends into an intermediate passage 108 which blends into a diverging outlet 110 having an upstream portion 112 and a downstream portion 114. The intermediate passage 108 and the upstream portion 112 provide a combustion chamber for a ram/scram engine as described with reference to FIGS. 1 to 11.

A composite rocket engine in the form of a plurality of clustered rocket engine units 126 is shown mounted at the rear of a core member 120 similarly to what was described with reference to FIGS. 1 to 11. The core member 120 has a pointed leading end 122, diverges rearwardly from the leading point 122 as shown at 124 to be of bulbous shape. At its rear, it converges as shown at 128 to form a pointed trailing end thus causing the annular diffuser 106 and annular intermediate passage 108 and annular upstream portion 112 to blend into a single large downstream outlet portion 114. All these features are similar to those described with reference to FIGS. 1 to 11.

By way of development, in the hollow cavity of the core member 120, there is provided liquifying means 130 in accordance with the invention.

The liquifying means 130 comprises a secondary, annular inlet 132 to let ambient air into the hollow core member. The inlet 132 may be adjustable to adjust its inlet configuration.

The inlet 132 leads into an annular inlet chamber 134. An assembly 136 of concentric heat exchangers are in communication with the inlet chamber 134 and defines a central passage 138.

The central passage 138 leads into an obliquely annular expansion turbine 140 which exits into a main passage within which flow line 142 is directed, and into an oxygen passage into which flow line 144 is directed.

The main passage doubles back to form a frusto-conically annular passage 145 extending rearwardly underneath the outer surface 124 of the core member 120. The passage 145 is extended via a spider or spokes which are not shown through the annular inlet 132 and via a further spider or spokes which are not shown into the after body of the casing 102 to be led out into the diverging outlet in the region of the rear portion 114. The oxygen passage 144 joins an oxygen duct (not shown) leading from the main oxygen reservoir of the engine 100 and via a pump 160 to one of the concentric heat exchangers 153 and from there to the rocket engines 126. The ducting or piping is not shown in FIG. 12, but is diagrammatically shown in FIG. 13.

A fuel line which is not shown leads from the main reservoir of fuel of the engine 100 and branches in two as can be visualized from FIG. 13. A first branch leads via a pump 158 into a further concentric heat exchanger 152 and thence to the rocket engine 126.

The second branch of the fuel line leads into another concentric heat exchanger 154, thence to yet a further concentric heat exchanger 151 and thence to a compressor 156 from where it is directed to the combustion chamber 108, 112 for combustion in the ram/scram jet engine.

The expansion turbine 140 drivingly connects to the compressor 156 and also to the pumps 158, 160. The transmission drives are not shown in FIG. 12.

It can be visualized from FIG. 13 that the heat exchangers 151, 152, 153 and 154 follow on each other in that order relative to the flow of ambient air into the liquifying means 130.

Connection boxes 146 are shown at opposed ends of the composite heat exchanger 136 via which connection and interconnection of the heat exchangers can be effected.

When ambient air enters the liquifying means 130 via the inlet 132, it flows through the composite heat exchanger 136 and is cooled while doing so. From the central passage 138 it flows into the expansion turbine 140 where the ambient air is further cooled to a temperature where of the oxygen in the air liquifies. The liquified oxygen is conducted as shown at 144 into the oxygen passage. The balance of the ambient air which comprises mainly nitrogen and also that portion of the oxygen which was not liquified, is conducted as shown at 142.

Rather than to describe the thermo-dynamic processes in narrative form, they are described by way of quantitative example with reference to FIG. 13 and TABLE III and IV.

EXAMPLE

The embodiment of FIGS. 12 and 13 was described above in qualitative terms. To show that that embodiment has promise to be practically feasible, a calculation for a number of flight conditions was performed. The results of such calculation are given hereunder. It is important to realize that the calculation has in mind demonstrating that physical values of feasible magnitude can have a useful result in accordance with the invention. The calculation does not purport to be exact or to be a working example.

| | Assumptions and Deductions: | |
|---|---|---|
| $O_2$ Mass flow: | Mass flow of $CH_4:O_2$ mixture = | 100 lbm/sec. |
| | Ratio of $CH_4:O_2$ mixture = | 1:3 |
| | which gives a mass flow of $CH_4$ = | 25 lbm/sec. |
| | and a mass flow of $O_2$ = | 75 lbm/sec. |
| | If 50% of $O_2$ is obtained from atmospheric air (at 30% $O_2$ by mass contained in air), | |
| | the mass flow of air = | $\frac{250}{2}$ |
| | | = 125 lbm/sec. |
| Heat Exchanger (HX) Efficiency ($\eta$): | | |
| | $\eta$ HX1 = 0,75 | |
| | $\eta$ HX2 = 0,90 | |
| | $\eta$ HX3 = 0,90 | |
| | $\eta$ HX4 = 0,85 | |

Skin Cooling and Friction

Neither the thermodynamic effect of skin cooling by means of the balance of ambient air, nor the thermodynamic effect of friction is taken into account.

Flight Conditions

The example was calculated for various speeds at corresponding target altitudes. The calculation was done for each of 16 stations marked 1' to 16' in FIG. 13 for the various flight conditions and under the assumptions tabulated in TABLE III. The results of the calculation are given in TABLE IV.

By way of explanation, with reference to TABLE III, it is to be appreciated that a limited mass of air only can be inducted via the secondary inlet 136. Item 9 in TABLE III expresses the amount of air thus inducted with reference to the potential oxygen capacity in the inducted ambient air as a percentage of the oxygen requirement of the rocket engine for the various speeds. For example, at Mach 3, the oxygen potentially available in the inducted air can fully satisfy the requirements of the rocket engine. At Mach 4, only 67% of the rocket engine requirements can be satisfied and the like.

It is further to be appreciated that not all of the oxygen in the inducted ambient air can be liquified and thus rendered useful for fuelling the rocket. Item 10 in TABLE III indicates what percentage of the available oxygen is liquified and expresses that as percentage liquified and in lb/sec.

Item 10 relates to the embodiment under consideration i.e. the embodiment of FIGS. 12 and 13.

Item 11 is similar to Item 10 but it is not relevant to the embodiment of FIGS. 12 and 13, but rather to the embodiment of FIGS. 14 and 15.

By way of explanation with reference to TABLE IV, at Station 6' indicated in FIG. 13, the balance of the ambient air i.e. the portion of the ambient air remaining when the liquified oxygen has been separated, is indicated as nitrogen or $N_2$ as it comprises mainly nitrogen, or by $N_2+$. Further with reference to TABLE IV and more specifically at Station 10, the fuel used in this example is methane or $CH_4$. It is carried in the form of "slush" i.e. nominally at its triple point where it can exist in the form of vapour, liquid and solids. The triple the balance of the ambient air expressed as 1 bm/sec of oxygen in vapour form and 1 bm/sec of nitrogen in vapour form.

TABLE III

| Item/Mach No. | Mach 3 | Mach 4 | Mach 7 | Mach 8 |
|---|---|---|---|---|
| 1. Target altitude (ft.) | 5000 | 80000 | 100000 | 120000 |
| 2. Ambient temperature (°R.) | 390 | 390 | 395 | 400 |
| 3. Ambient pressure (psi) | 2,1 | 0,14 | 0,12 | 0,1 |
| 4. Ram pressure (psi) | 28 | 29 | 21 | 40 |
| 5. Ram temperature (°R.) | 892 | 1301 | 3329 | 4000 |
| 6. Scram pressure (psi) | 4 | 2 | 3 | — |
| 7. Scram temperature (°R.) | 677 | 807 | 1213 | 1280 |
| 8. Scram fuel flow (lb/sec) | 56 | 27 | 8 | 11 |
| 9. Potential $O_2$ provision from ambient air | 100% | 67% | 33% | 25% |
| 10. FIG. 12 embodiment: Oxygen distillation lbm/sec/ % of potential | 37,5 50% | 25,1 33,5% | 12,0 17% | 9,4 12,5% |
| 11. FIG. 14 embodiment: Oxygen distillation lbm/sec/ % of potential | 67,5 90% | 45 60% | 22,5 30% | 17,3 23% |

TABLE IV

Mach 3 @ 50000 ft.    100% air    (390° R. @ 2,1 psi ambient)

| Station | 1' | 2' | 3' | 4' | 5' | 6' | 7' | 8' | 9' | 10' | 11' | 12' | 13' | 14' | 15' | 16' |
|---|---|---|---|---|---|---|---|---|---|---|---|---|---|---|---|---|
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Gas | Liq. | Liq. | Gas | Slush | Liq. | Gas | Gas | Gas | Gas | Gas |
| Temp. (°R.) | 890 | 800 | 625 | 350 | 180 | 160 | 160 | 220 | 600 | 180 | 180 | 750 | 300 | 650 | 850 | 600 |
| Pressure (psi) | 28 | 24 | 21 | 18 | 15 | 6 | 6 | 310 | 300 | 2,1 | 310 | 300 | 1,2 | 0,5 | 5 | 0,3 |
| Mass flow (lbm/sec) | 250 | 250 | 250 | 250 | 250 | 175 | 25 | 75 | 75 | 56 | 56 | 56 | 56 | 56 | 56 | 175 |
| | | | | | | 50 | | | | | | | | | | 50 |

Mach 4 @ 80000 ft.    67% air    (390° R. @ 0,14 psi ambient)

| Station | 1' | 2' | 3' | 4' | 5' | 6' | 7' | 8' | 9' | 10' | 11' | 12' | 13' | 14' | 15' | 16' |
|---|---|---|---|---|---|---|---|---|---|---|---|---|---|---|---|---|
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Gas | Liq. | Liq. | Gas | Slush | Liq. | Gas | Gas | Gas | Gas | Gas |
| Temp. (°R.) | 1300 | 1100 | 850 | 350 | 180 | 160 | 160 | 220 | 750 | 180 | 180 | 950 | 325 | 1050 | 1400 | 900 |
| Pressure (psi) | 29 | 26 | 23 | 20 | 17 | 6,5 | 6,5 | 310 | 300 | 0,14 | 310 | 300 | 0,1 | 0,05 | 3 | 0,3 |
| Mass flow (lbm/sec) | 168 | 168 | 168 | 168 | 168 | 118 | 17 | 75 | 75 | 27 | 27 | 27 | 27 | 27 | 27 | 118 |
| | | | | | | 33 | | | | | | | | | | 33 |

Mach 7 @ 100000 ft.    33% air    (395° R. @ 0,12 psi ambient)

| Station | 1' | 2' | 3' | 4' | 5' | 6' | 7' | 8' | 9' | 10' | 11' | 12' | 13' | 14' | 15' | 16' |
|---|---|---|---|---|---|---|---|---|---|---|---|---|---|---|---|---|
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Gas | Liq. | Liq. | Gas | Slush | Liq. | Gas | Gas | Gas | Gas | Gas |
| Temp. (°R.) | 3330 | 3150 | 2340 | 280 | 190 | 160 | 160 | 220 | 2000 | 180 | 180 | 2900 | 2100 | 3000 | 3750 | 1000 |
| Pressure (psi) | 21 | 19 | 17 | 16 | 15 | 6 | 6 | 310 | 300 | 0,12 | 310 | 300 | 0,09 | 0,06 | 2 | 0,3 |
| Mass flow (lbm/sec) | 83 | 83 | 83 | 83 | 83 | 58 | 9 | 75 | 75 | 8 | 8 | 8 | 8 | 8 | 8 | 58 |
| | | | | | | 16 | | | | | | | | | | 16 |

Mach 8 @ 110000 ft.    25% air    (400° R. @ 0,1 psi ambient)

| Station | 1' | 2' | 3' | 4' | 5' | 6' | 7' | 8' | 9' | 10' | 11' | 12' | 13' | 14' | 15' | 16' |
|---|---|---|---|---|---|---|---|---|---|---|---|---|---|---|---|---|
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Gas | Liq. | Liq. | Gas | Slush | Liq. | Gas | Gas | Gas | Gas | Gas |
| Temp. (°R.) | 4000 | 3500 | 2500 | 280 | 200 | 160 | 160 | 220 | 2100 | 180 | 180 | 3100 | 2150 | 3250 | 4000 | 1100 |
| Pressure (psi) | 40 | 38 | 36 | 34 | 32 | 12 | 12 | 310 | 300 | 0,1 | 310 | 300 | 0,08 | 0,06 | 2 | 0,3 |
| Mass flow (lbm/sec) | 62 | 62 | 62 | 62 | 62 | 45 | 6 | 75 | 75 | 11 | 11 | 11 | 11 | 11 | 11 | 45 |
| | | | | | | 11 | | | | | | | | | | 11 | point temperature for methane is nominally 180° R.

Further with reference to TABLE IV and more specifically Station 11', it is to be noted that the temperature of the methane has remained at 180° R. This indicates that latent heat only is involved in thermodynamic process between Stations 10' and 11'.

Further with reference to TABLE IV, and more specifically Station 6' and 7' and also Station 16', Station 7' indicates the mass of oxygen liquified by the liquifying means and Stations 6' and 16' indicate the mass of Expansion Turbine The work output of the expansion turbine 140, by way of example of Mach 3, was calculated as 5 300 hp. This corresponds to a pressure drop across the expansion turbine of 7 psi implying a sink available at an absolute pressure of 4 psi.

Flow areas

Assuming a flow of speed of 10 000 feet per minute, the area of heat exchanger 151 was calculated as 34 ft$^2$. A heat exchanger of annular cylindrical format of 3 ft diameter and 3 ft length is indicated.

The expansion turbine 140 may be of radial or centrifugal form having an outlet diameter of 1 ft and a width of 1,5 ft.

The compressor 156 may be of radial or centrifugal form having an inlet diameter of 2 ft and a width of 0,75 ft.

To commence operation of the liquifying means 130, a reservoir 162 is provided for hydrogen peroxide. A hydrogen peroxide duct 164 is provided which is axially movable not only to conduct hydrogen peroxide but also to operate valve means incorporated in the duct to commence flow of hydrogen peroxide into the passage 138 and to stop such flow. A catalyst for the hydrogen peroxide to product steam is also incorporated in the duct 164. Thus, to commence operation of the liquifying means 130, the duct 164 is axially moved toward the leading end of the core member 120 thus allowing hydrogen peroxide to flow via the duct and the catalyst and thus generates steam to flow through the expansion turbine 140 to bring the liquifying means in operating until it can be operated when sufficient speed has been attained in flight.

A further developed version similar to the embodiment of FIGS. 12 and 13 is now described with reference to FIGS. 14 and 15. Most features and items are similar to the FIGS. 12 and 13 embodiment and are numbered alike. They are not again described.

The development of the embodiment 200 is a fifth heat exchanger 255 positioned in the central passage 238. In respect of the ambient air, the heat exchanger 255 is immediately downstream of the composite heat exchanger 236 and serves to lower the temperature of the ambient air even further before induction into the expansion turbine 240. The heat exchanger 255 is driven by means of a portion of the balance of the ambient air. Such portion is branched off from the main passage 242 to go via the heat exchanger 255 to the augmentation shroud 214. The remaining portion of the balance of the ambient air is still utilized for skin cooling in the passage 245 as was described with reference to FIGS. 12 and 13.

The enhanced performance of the embodiment of FIGS. 14 and 15 are shown in TABLE V which follows and which is similar to TABLE IV.

TABLE V

| Station | 1' | 2' | 3' | 4' | 5' | 6' | 7' | 8' | 9' | 10' | 11' | 12' | 13' | 14' | 15' | 16' |
|---|---|---|---|---|---|---|---|---|---|---|---|---|---|---|---|---|
| | | | | Mach 3 @ 50000 ft. | | 100% air | | (390° R. @ 2,1 psi ambient) | | | | | | | | |
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Liq. | Liq. | Liq. | Gas | Slush | Liq. | Gas | Gas | Gas | Gas | Gas |
| Temp. (°R.) | 890 | 800 | 625 | 350 | 180 | 160 | 160 | 220 | 600 | 180 | 180 | 750 | 300 | 650 | 850 | 600 |
| Pressure (psi) | 28 | 24 | 21 | 18 | 15 | 6 | 6 | 310 | 300 | 2,1 | 310 | 300 | 1,2 | 0,5 | 5 | 0,3 |
| Mass flow (lbm/sec) | 250 | 250 | 250 | 250 | 250 | 15 175 | 60 | 75 | 75 | 81 | 25 | 25 | 56 | 56 | 56 | 15 175 |
| | | | | Mach 4 @ 80000 ft. | | 67% air | | (390° R. @ 0,14 psi ambient) | | | | | | | | |
| Station | 1' | 2' | 3' | 4' | 5' | 6' | 7' | 8' | 9' | 10' | 11' | 12' | 13' | 14' | 15' | 16' |
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Liq. | Liq. | Liq. | Gas | Slush | Liq. | Gas | Gas | Gas | Gas | Gas |
| Temp. (°R.) | 1300 | 1100 | 850 | 350 | 180 | 160 | 160 | 220 | 750 | 180 | 180 | 950 | 325 | 1050 | 1400 | 900 |
| Pressure (psi) | 29 | 26 | 23 | 20 | 17 | 6,5 | 6,5 | 310 | 300 | 0,14 | 310 | 300 | 0,1 | 0,05 | 3 | 0,3 |
| Mass flow (lbm/sec) | 168 | 168 | 168 | 168 | 168 | 10 118 | 40 | 75 | 75 | 52 | 25 | 25 | 27 | 27 | 27 | 10 118 |
| | | | | Mach 7 @ 100000 ft. | | 33% air | | (395° R. @ 0,12 psi ambient) | | | | | | | | |
| Station | 1' | 2' | 3' | 4' | 5' | 6' | 7' | 8' | 9' | 10' | 11' | 12' | 13' | 14' | 15' | 16' |
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Liq. | Liq. | Liq. | Gas | Slush | Liq. | Gas | Gas | Gas | Gas | Gas |
| Temp. (°R.) | 3330 | 3150 | 2340 | 280 | 190 | 160 | 160 | 220 | 2000 | 180 | 180 | 2900 | 2100 | 3000 | 3750 | 1000 |
| Pressure (psi) | 21 | 19 | 17 | 16 | 15 | 6 | 6 | 310 | 300 | 0,12 | 310 | 300 | 0,09 | 0,06 | 2 | 0,3 |
| Mass flow (lbm/sec) | 83 | 83 | 83 | 83 | 83 | 5 58 | 20 | 75 | 75 | 33 | 25 | 25 | 8 | 8 | 8 | 5 58 |
| | | | | Mach 8 @ 110000 ft. | | 25% air | | (400° R. @ 0,1 psi ambient) | | | | | | | | |
| Station | 1' | 2' | 3' | 4' | 5' | 6' | 7' | 8' | 9' | 10' | 11' | 12' | 13' | 14' | 15' | 16' |
| Medium | Air | Air | Air | Air | Air | $N_2+$ | $O_2$ | $O_2$ | $O_2$ | $CH_4$ | $CH_4$ | $CH_4$ | $CH_4$ | $CH_4$ | $CH_4$ | $N_2+$ |
| State | Gas | Gas | Gas | Gas | Gas | Gas | Liq. | Liq. | Gas | Slush | Liq. | Gas | Gas | Gas | Gas | Gas |
| Temp. (°R.) | 4000 | 3500 | 2500 | 280 | 200 | 160 | 160 | 220 | 2100 | 180 | 180 | 3100 | 2150 | 3250 | 4000 | 1100 |
| Pressure (psi) | 40 | 38 | 36 | 34 | 32 | 12 | 12 | 310 | 300 | 0,1 | 310 | 300 | 0,08 | 0,06 | 2 | 0,3 |
| Mass flow (lbm/sec) | 62 | 62 | 62 | 62 | 62 | 4 43 | 15 | 75 | 75 | 36 | 25 | 25 | 11 | 11 | 11 | 4 43 |

It may be desired to drive the pumps 258 and 260 from a source other than the expansion turbine 240. Thus, a turbine 266 is provided which can be driven by hydrogen peroxide and which drivingly connects the pumps 258 and 260. This will be a secondary function of the hydrogen peroxide as its primary function will still be to generate steam to put the induction turbine 240 in operation to commence operation of the liquifying means 230.

Yet a further developed version of an aerospace engine is indicated by reference numeral 300 in FIG. 16 and its operation is diagrammatically illustrated in FIG. 17.

In many respects the aerospace engine 300 is similar to the engines 100 and 200 and like components are numbered alike. Its operation can best be appreciated by reference to FIG. 17.

The Inventor visualizes that oxygen may already start to liquify downstream of the heat exchangers. Thus, a liquid oxygen separator which may be in the form of a cyclone, is provided in the oxygen lying downstream of the heat exchangers and is indicated by reference numeral 372 in FIG. 17.

From the cyclone 372, the ambient air flows into a compressor 356 to compress the air. Downstream of the compressor 356, the air is intercooled in an intercooler 355. From the intercooler 355, the intercooled air proceeds to the expansion turbine 340. Liquified oxygen is joined with oxygen separated by the cyclone 372 and with liquid oxygen from a liquid oxygen reservoir. The liquid oxygen is pressurized in a pump 360 from where it flows via the heat exchanger 353 to the rocket engine 326.

The intercooler 355 is driven by means of methane which, in this embodiment, is pressurized in a pump 358 prior to flowing through the intercooler 355 and the heat exchanger 352 whence it branches to go to the rocket engine 326 and to the combustion chamber.

With reference to FIG. 18, the thermodynamic processes in respect of oxygen and nitrogen from position 6 upstream of the compressor 356, through the compressor 356 to condition 7 and thence through the intercooler to condition 8 and thence through the expansion turbine to condition 9, are plotted on an enthalpy diagram.

TABLE VI below reflects results of a calculation performed for the embodiment 300.

TABLE VI

| | Mach 3 @ 50000 ft. | | | | | | (390° R. @ 2,1 psi ambient) | | | | |
|---|---|---|---|---|---|---|---|---|---|---|---|
| Station | 1' | 2' | 3' | 4' | 5' | 6' | 7' | 8' | 9' | 10' | 11' |
| Medium | Air | Air | Air | Air | Air | Air | Air | $O_2$ | $N_2+$ | $N_2+$ | $N_2+$ |
| State | Gas | Gas | Gas | Gas | Gas | Gas | Gas | Liq. | Gas | Gas | Gas |
| Temp. (°R.) | 890 | 470 | 290 | 200 | 169 | 270 | 200 | 145 | 145 | 185 | 185 |
| Pressure (psi) | 28 | 24 | 21 | 18 | 15 | 75 | 75 | 6 | 6 | 5 | 5 |
| Mass flow (lbm/sec) | 250 | 250 | 250 | 250 | 250 | 250 | 250 | 60 | 190 | 190 | 155 |

| Station | 12' | 13' | 14' | 15' | 16' | 17' | 18' | 19' | 20' | 21' |
|---|---|---|---|---|---|---|---|---|---|---|
| Medium | $N_2+$ | $N_2+$ | $N_2+$ | $O_2$ | $O_2$ | $O_2$ | $CH_4$ | $CH_4$ | $CH_4$ | $CH_4$ |
| State | Gas | Gas | Gas | Liq. | Liq. | Gas | Liq. | Liq. | Liq. Gas | Gas |
| Temp. (°R.) | 750 | 185 | 550 | 160 | 180 | 250 | 180 | 180 | 200 | 400 |
| Pressure (psi) | 4 | 5 | 4 | 2,1 | 310 | 300 | 2,1 | 320 | 310 | 300 |
| Mass flow (lbm/sec) | 155 | 35 | 35 | 75 | 75 | 75 | 81 | 81 | 81 | 81 |

The Inventor believes that a saving can be obtained in accordance with the invention in the on-board oxygen required for an aerospace plane of the kind to which this invention relates at take-off. The Inventor further believes that the saving in mass is more than the added mass of the liquifying means and that a net saving can be obtained which is potentially available as increased payload. The significance of a marginal saving in on-board oxygen and the market effect on potential increase in payload has been discussed above.

I claim:

1. An engine suitable for use in an aerospace plane, the engine comprising:
   a casing having an inlet end and an outlet end;
   a diffuser positioned within said casing at said inlet end;
   an intermediate passage within said casing and positioned downstream of, and in series with, the diffuser;
   a diverging outlet within said casing and positioned downstream of, and in series with, the intermediate passage, the intermediate passage and an upstream portion of the diverging outlet forming combustion chamber within the casing;
   a hollow aerodynamic core member having an internal cavity and a rearwardly directed outlet in communication with the internal cavity, the core member being shaped to have a closed pointed leading end such that the core member diverges rearwardly from said pointed leading end and is arranged in association with, and in proximity to, the diffuser; and
   a rocket engine accommodated within the internal cavity of the core member and being operatively in alignment with the rearwardly directed outlet.

2. An engine as claimed in claim 1 in which the diffuser is adjustable to vary its inlet configuration.

3. An engine as claimed in claim 1 in which rocket engine is a composite engine of cluster design.

4. An engine as claimed in claim 1 which further comprises a turbo-jet engine annularly within the casing and around the combustion chamber.

5. An engine as claimed in claim 4 in which an inlet diffuser of the turbo-jet engine leads out of the diffuser.

6. An engine as claimed in claim 4 in which an outlet of the turbo-jet engine is directed into said diverging outlet.

7. An engine as claimed in claim 2 which further comprises a secondary ambient air inlet, oxygen liquifying means which is arranged to receive flow of ambient air from the secondary inlet, which is adapted to liquify oxygen for combustion from the ambient air and to separate it from the balance of the ambient air, and means for introducing the oxygen for combustion into the rocket engine.

8. An engine as claimed in claim 7 in which the oxygen liquifying means comprises a plurality of heat exchangers arranged in series and such as to utilize as cooling fluids respectively fuel from a fuel reservoir and said oxygen for combustion.

9. An engine as claimed in claim 8 in which the liquifying means further comprises an expansion turbine arranged to receive and to expand the ambient air to lower its temperature, and a pressurizing machine drivingly connected to the expansion turbine and arranged to pressurize fuel for introduction into the combustion chamber formed by the intermediate passage and leading portion of the diverging outlet.

10. An engine as claimed in claim 9 in which the liquifying means comprises a further heat exchanger downstream of said plurality of heat exchangers which further heat exchanger is arranged to be driven by said balance of the ambient air.

11. An engine as claimed in claim 10 in which the liquifying means comprises an ambient air compressor upstream of and drivingly connected to the expansion turbine to pressurize the ambient air, and an intercooler intermediate said ambient air compressor and the expansion turbine to cool the pressurized ambient air prior to entering the expansion turbine.

12. An engine as claimed in claim 11 in which the intercooler is arranged to be driven by fuel en route to one of the heat exchangers.

13. An engine suitable for use in an aerospace plane, the engine comprising:

a casing having an inlet end and an outlet end;

a diffuser positioned within said casing at said inlet and;

an intermediate passage within said casing and positioned downstream of, and in series with, the diffuser;

a diverging outlet within said casing and positioned downstream of, and in series with, the intermediate passage, the intermediate passage and an upstream portion of the diverging outlet forming a combustion chamber within the casing;

a hollow aerodynamic core member having an internal cavity and a rearwardly directed outlet in communication with the internal cavity, the core member being shaped to have a closed pointed leading end such the core member diverges rearwardly from said pointed leading end and is arranged in association with, and in proximity to, the diffuser, said core member is axially movable between an extended forward and a retracted rearward position wherein, in the forward position the pointed leading end is axially positioned upstream of the diffuser and wherein, in the retracted rearward position, the leading end is axially positioned within the diffuser; and a rocket engine accommodated within the internal cavity of the core member and being operatively in alignment with the rearwardly directed outlet.

* * * * *